United States Patent
Yang et al.

(10) Patent No.: US 11,064,548 B2
(45) Date of Patent: Jul. 13, 2021

(54) DEVICE, SYSTEM AND METHOD TO IMPLEMENT MULTIPLE-INPUT MULTIPLE-OUTPUT CHANNEL ACCESS RULES IN AN ENHANCED DIRECTIONAL MULTI-GIGABIT NETWORK

(71) Applicant: Intel Corporation, Santa Clara, CA (US)

(72) Inventors: Ou Yang, Santa Clara, CA (US);
Solomon B. Trainin, Haifa (IL);
Carlos Cordeiro, Portland, OR (US);
Cheng Chen, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/538,754

(22) Filed: Aug. 12, 2019

(65) Prior Publication Data
US 2020/0037384 A1 Jan. 30, 2020

Related U.S. Application Data

(63) Continuation of application No. 15/638,656, filed on Jun. 30, 2017, now Pat. No. 10,425,982.

(51) Int. Cl.
*H04W 76/16* (2018.01)
*H04W 74/04* (2009.01)
*H04W 74/02* (2009.01)
*H04B 7/0413* (2017.01)
*H04W 74/08* (2009.01)
(Continued)

(52) U.S. Cl.
CPC .......... *H04W 76/16* (2018.02); *H04B 7/0413* (2013.01); *H04L 1/1887* (2013.01); *H04W 74/02* (2013.01); *H04W 74/04* (2013.01); *H04W 74/0816* (2013.01); *H04L 1/1685* (2013.01); *H04W 74/06* (2013.01); *H04W 74/08* (2013.01); *H04W 76/11* (2018.02); *H04W 84/12* (2013.01)

(58) Field of Classification Search
CPC .... H04B 7/0695; H04B 7/0413; H04H 20/72; H04L 41/0893; H04L 1/1887; H04W 74/02; H04W 74/04; H04W 74/0816; H04W 76/16
See application file for complete search history.

(56) References Cited

U.S. PATENT DOCUMENTS 10,172,137 B1* 1/2019 Hedayat ............ H04W 72/0473
10,257,859 B1* 4/2019 Chu .................. H04W 74/0808
(Continued)

*Primary Examiner* — Melanie Jagannathan
(74) *Attorney, Agent, or Firm* — Alliance IP, LLC

(57) ABSTRACT

A wireless communication device, system and method. The device includes a memory, a processing circuitry coupled to the memory and including logic, the processing circuitry to cause communication in an Enhanced Directional Multi-Gigabit (EDMG) network. The processing circuitry may be configured to: activate at least one Radio Frequency (RF) chain of a plurality of RF chains to allow detection of a preamble of a wireless communication and to allow a setting of a Network Allocation Vector (NAV); detect the preamble using the at least one RF chain; set the NAV using the at least one RF chain; maintain a backoff timer for the at least one RF chain; and, in response to a determination that the backoff timer has reached zero, cause a Multiple Input Multiple Output (MIMO) wireless communication in the EDMG network.

12 Claims, 7 Drawing Sheets

(51) Int. Cl.
*H04L 1/18* (2006.01)
*H04W 74/06* (2009.01)
*H04L 1/16* (2006.01)
*H04W 76/11* (2018.01)
*H04W 84/12* (2009.01)

(56) References Cited

U.S. PATENT DOCUMENTS

| | | | |
|---|---|---|---|
| 10,492,221 B1* | 11/2019 | Chu | E21B 21/08 |
| 2010/0309779 A1* | 12/2010 | Amini | H04H 20/72 370/221 |
| 2013/0028186 A1 | 1/2013 | Kim | |
| 2013/0331077 A1 | 12/2013 | Mucke et al. | |
| 2016/0050659 A1 | 2/2016 | Seok | |
| 2017/0164409 A1* | 6/2017 | Kim | H04W 74/0825 |
| 2017/0171773 A1* | 6/2017 | Cariou | H04W 74/0841 |
| 2017/0187439 A1* | 6/2017 | Park | H04L 1/0009 |
| 2017/0188376 A1* | 6/2017 | Noh | H04W 72/046 |
| 2017/0238255 A1 | 8/2017 | Chari et al. | |
| 2017/0265221 A1* | 9/2017 | Yang | H04B 7/0617 |
| 2017/0295588 A1* | 10/2017 | Ahn | H04W 72/12 |
| 2017/0302510 A1* | 10/2017 | Yang | H04W 74/008 |
| 2017/0303313 A1* | 10/2017 | Cariou | H04W 74/0816 |
| 2017/0325264 A1* | 11/2017 | Cherian | H04W 74/0816 |
| 2018/0026695 A1 | 1/2018 | Johnsson et al. | |
| 2018/0049242 A1* | 2/2018 | Viger | H04W 74/0816 |
| 2018/0077723 A1* | 3/2018 | Adachi | H04L 5/0091 |
| 2018/0352473 A1 | 12/2018 | Gunasekara et al. | |
| 2019/0124652 A1* | 4/2019 | Kim | H04L 5/0092 |
| 2019/0140730 A1* | 5/2019 | Oteri | H04B 7/0417 |
| 2019/0280919 A1* | 9/2019 | Sadeghi | H04L 41/0803 |
| 2019/0289576 A1* | 9/2019 | Park | H04W 74/08 |
| 2019/0364492 A1* | 11/2019 | Azizi | H04W 4/029 |
| 2020/0067577 A1* | 2/2020 | Lou | H04B 7/04 |
| 2020/0162135 A1* | 5/2020 | Sun | H04B 17/318 |

* cited by examiner

DEVICE, SYSTEM AND METHOD TO IMPLEMENT MULTIPLE-INPUT MULTIPLE-OUTPUT CHANNEL ACCESS RULES IN AN ENHANCED DIRECTIONAL MULTI-GIGABIT NETWORK

CROSS-REFERENCE TO RELATED APPLICATIONS

This Application is a continuation (and claims the benefit of priority under 35 U.S.C. § 120) of U.S. application Ser. No. 15/638,656, filed Jun. 30, 2017 and entitled DEVICE, SYSTEM AND METHOD TO IMPLEMENT MULTIPLE-INPUT MULTIPLE-OUTPUT CHANNEL ACCESS RULES IN AN ENHANCED DIRECTIONAL MULTI-GIGABIT NETWORK. The disclosure of the prior Application is considered part of and is incorporated by reference in the disclosure of this Application.

TECHNICAL FIELD

This disclosure generally relates to systems and methods for wireless communications and, more particularly, to timeouts for wireless communication such as in 60 GHz networks including Wi-Gig.

BACKGROUND

Devices may communicate over a next generation 60 GHz (NG60) network, a directional multi-gigabit (DMG) network, an enhanced DMG (EDMG) network, and/or any other network.

The Institute of Electrical and Electronics Engineers (IEEE) 802.11ay developing standard, also referred to as Next Generation 60 GHz or NG60, facilitates EDMG networks, and supports Single-User (SU) Multiple-Input Multiple-Output (MIMO) and Downlink (DL) Multi-User (MU) MIMO (MU MIMO). Currently, MIMO channel access rules, and specifically ways in which to perform Clear Channel Assessment (CCA), to maintain Network Allocation Vectors (NAVs), and/or to configure a backoff timer to allow MIMO channel access, are not defined for EDMG networks.

DETAILED DESCRIPTION

Figure 1:
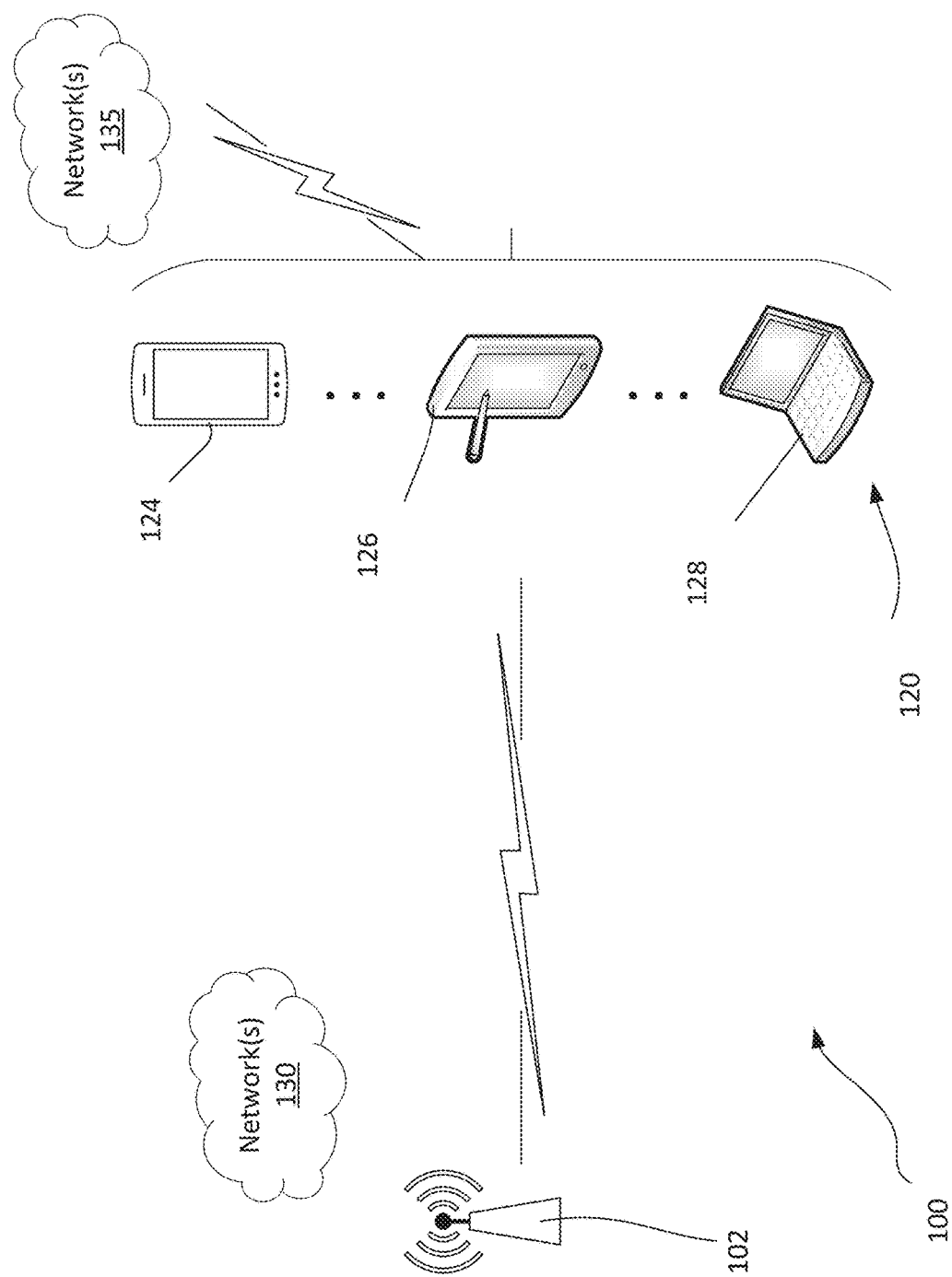
FIG. 1 shows an exemplary EDMG environment, in accordance with one or more embodiments.

Example embodiments described herein provide certain systems, methods, and devices, for providing signaling information to Wi-Fi devices in various Wi-Fi networks, including, but not limited to, IEEE 802.11ad and/or IEEE 802.11ay (i.e. Next Generation 60 GHz or NG60).

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A directional multi-gigabit (DMG) communication may involve one or more directional links to communicate at a rate of multiple gigabits per second. An amendment to a DMG operation in a 60 GHz band, e.g., according to an Institute of Electrical and Electronics Engineers (IEEE) 802.11ad standard, may be defined, for example, by an IEEE 802.11ay project (NG60 project). EDMG compliant devices may provide a maximum throughput of at least 20 gigabits per second (measured at the Medium Access Control (MAC) data service access point), while maintaining or improving the power efficiency per station. EDMG operation is typically on license-exempt bands above 45 GHz, such as, for example, 60 GHz. Stations (STAs) devices in compliance with 802.11ay may be termed enhanced DMG STAs (EDMG STAs) or EDMG devices. It is to be noted that "STA" as used herein may be used to refer among other things to a user device or to an access point (AP). In some demonstrative embodiments, one or more STAs may be configured to communicate over an EDMG basic service set (EDMG BSS), and/or any other network. In some scenarios, a DMG or EDMG STA may have reciprocal DMG or EDMG antennas.

A Network Allocation Vector (NAV) can refer to a virtual carrier-sensing mechanism that can be used with wireless network protocols. A header of a frame at the Medium Access Control layer (MAC layer) may include a duration field from which a transmission time required for transmission of the frame may be determined by the receiver. The STAs listening on the wireless medium that are different from the STA or STAs to which the frame payload is addressed (NAV setting STAs) may decode the duration field and set their NAVs accordingly (this deferring their access to the medium for the duration of the frame transmission). If a STA is an unintended receiver, it may update its NAV table, and, if it is a DMG STA, it may check if it can create an antenna pattern to avoid all the interference indicated by the active NAVs.

Embodiments provide two main options for providing MIMO channel access in a EDMG network. In general, according to embodiments, multiple radio frequency (RF) chains may participate in gaining MIMO channel access. According to a first demonstrative embodiment or option 1, reach RF chain in a system with multiple RF chains may participate in preamble detection and NAV setting. According to this option, the MIMO backoff timer may decrease in response to a determination that all RF chains have sensed the medium to be clear. According to a second demonstrative embodiment or option 2, an RF chain dedicated for SISO communication may be considered as a primary RF chain, and may be the only RF chain used for preamble detection and NAV setting (that is, the RF chain dedicated for SISO may use both physical and virtual carrier sense to determine whether a channel is busy), while any other RF chains may be considered secondary RF chains, and would not participate in preamble detection or NAV setting, but would maintain CCA energy detection (that is the secondary RF chains may use only physical carrier sensing) to determine whether MIMO channel access should be granted.

According to this second option, the backoff timer may be associated with the primary RF chain only, and CCA may have to be clear for at least a Point Coordination Function Interframe Space (PIFS) time period (which time interval represents the time interval immediately preceding the time when the backoff counter reaches 0) before the secondary RF chains may gain access to the medium. More regarding these two options will be described further below. It is to be noted that each option encompasses many variations and embodiments in its own right.

FIG. 1 is a network diagram illustrating an example network environment, according to some example embodiments of the present disclosure. Wireless network 100 may include one or more STAs or user devices 120 and one or more access point(s) (AP) 102, which may communicate in accordance with IEEE 802.11 communication standards, including, but not limited to, IEEE 802.11ad and/or IEEE 802.11ay. The STAs or user devices 120 may be mobile user devices that are non-stationary and do not have fixed locations.

Each of the STAs or user devices 120 (e.g., 124, 126, or 128) may include any suitable processor-driven user device including, but not limited to, a desktop user device, a laptop user device, a server, a router, a switch, an access point, a smartphone, a tablet, a wearable wireless user device (e.g., bracelet, watch, glasses, ring, etc.) and so forth. In some embodiments, the STAs or user devices 120 and AP 102 may include one or more computer systems similar to that of the functional diagrams of FIG. 2a or 2b and/or the example machine/system of FIG. 4, to be discussed further.

Returning to FIG. 1, any of the STAs or user devices 120 (e.g., STAs 124, 126, 128), and AP 102 may be configured to communicate with each other via one or more communications networks 130 and/or 135, such as EDMG networks. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANS), wide area networks (WANs), local area networks (LANs), or personal area networks (PANS). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the STAs or user devices 120 (e.g., STAs 124, 126, 128), and AP 102 may include one or more communications antennae. Communications antenna may be any suitable type of antenna corresponding to the communications protocols used by the STAs or user devices 120 (e.g., STAs 124, 124 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, phased array antennas, or the like. The communications antennas may be communicatively coupled to a radio component or radio frequency (RF chain) to transmit and/or receive signals, such as communications signals to and/or from the STAs or user devices 120.

Any of the STAs or user devices 120 (e.g., STAs 124, 126, 128), and AP 102 may include any suitable baseband processing circuitry, and any suitable radio and/or transceiver for transmitting and/or receiving radio frequency (RF) signals in the bandwidth and/or channels corresponding to the communications protocols utilized by any of the STAs or user devices 120 and AP 102 to communicate with each other. The baseband processing circuitry may include a memory and one or more processors that may include hardware and software/logic to modulate and/or demodulate communications signals according to pre-established transmission protocols. The radio components or RF chains may further have hardware in the form of a radio integrated circuit and a front-end module connected to the one or more antennas, and/or software instructions to communicate via one or more Wi-Fi and/or Wi-Fi direct protocols, as set forth in an IEEE 802.11 standards. In certain example embodiments, the baseband processing circuitry, radio component, in cooperation with the communications antennas, may be configured to communicate via 2.4 GHz channels (e.g. 802.11, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In some demonstrative embodiments, one or more STAs may be configured to communicate a multi-user (MU) multiple-input and multiple-output (MIMO) frame, for example, over an EDMG frequency band, such as a 60 GHz frequency band. The one or more STAs may be configured to communicate in a mixed environment such that one or more legacy STAs are able to communicate with one or more non-legacy STAs. STAs may communicate with each other at least to some extent regardless of which IEEE 802.11 specification is followed.

Figure 2A:
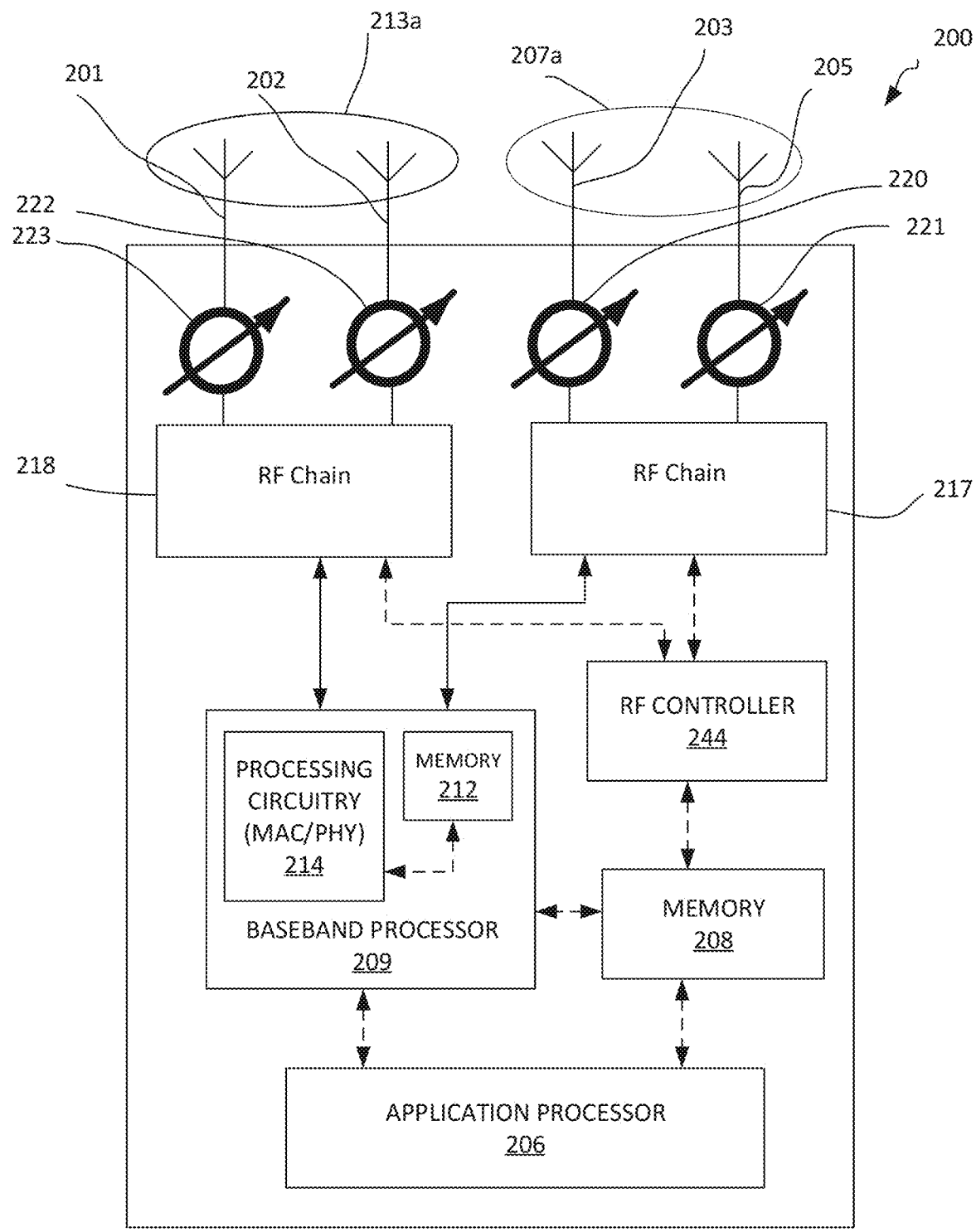
FIGS. 2a and 2b show respective block diagrams of a first embodiment and a second embodiment of a STA.
Figure 2B:
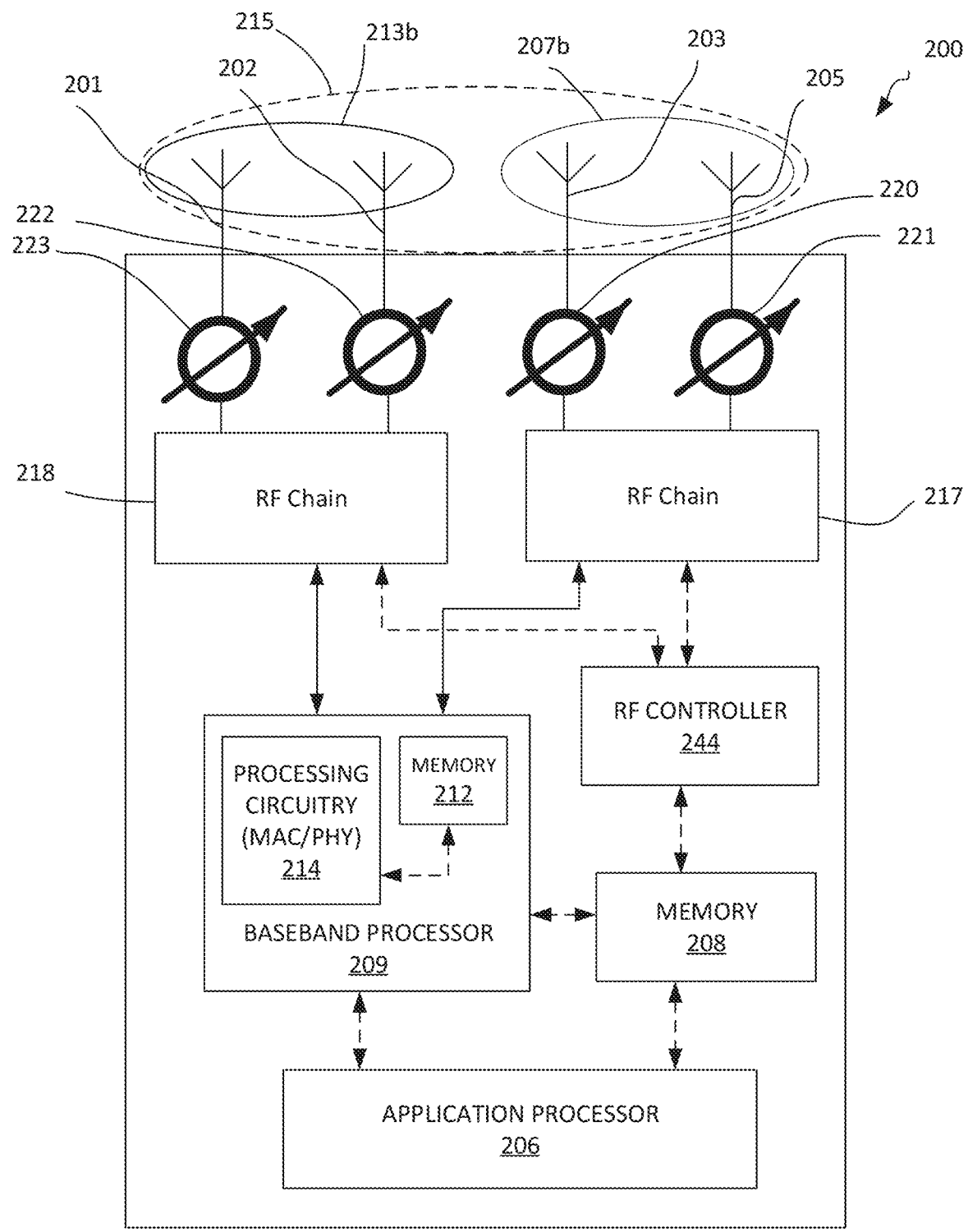

FIGS. 2a and 2b show functional diagrams of two exemplary embodiments including, respectively, STAs 200a and 200b. FIGS. 2a and 2b represent functional block diagrams of two STA embodiments that may be suitable for use as an AP 102 (FIG. 1) or user device 120 (FIG. 1) in accordance with some embodiments. In some instances, in the present description, the STAs 200a or 200b may be referred to as system 200. Like components may be referred to in FIGS. 2a and 2b with like reference numerals, it being understood that such like components may have functionalities that may be distinguishable as between FIGS. 2a and 2b. The STA 200a or 200b may be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device. It is to be noted that, in FIGS. 2a and 2b, double sided solid arrows represent the flow of signals either to or from the shown RF chains, whereas the double sided broken arrows represent the flow of other signals between the components of the STAs 200a and 200b.

Referring now to FIG. 2a, the embodiment of a STA 200a that may be used to implement option 1 is shown. STA 200a may include a number of radio frequency (RF) chains 217 and 218, with each RF chain including a transmit (TX) chain and a receive (RX) chain as would be recognized by one skilled in the art. Antennas 207a and 213a each represent a phased-array antenna and are each shown to include respective antenna elements. In particular, antenna 207a includes antenna elements 203a and 205a, with each antenna element connected to its own phase shifter, such as, respectively, phase shifters 220 and 221. Antenna 213a includes antenna elements 201 and 202, with each antenna element connected to its own phase shifter, such as, respectively, phase shifters 222 and 223. The phase shifters are to allow analog beamforming in a well-known manner. Each antenna 207a and 213a in the embodiment of FIG. 2a is shown as being connected to its own RF chain.

The RF chains 217 and 218 may comprise circuitry configured to operate on EDMG signals to or from antennas 207a and 213a, to amplify the signals, typically using a single amplifier per RF chain, and to provide the amplified versions of the signals for further processing, such as to baseband processor 209 if the signals are RX signals, or to the antennas if the signals are TX signals. Embodiments further contemplate the use of other well-known components in the RF chains, such as oscillators and phase-lock loops (not shown), as would be recognized by one skilled in the art. The RF chains may further include circuitry to down-convert RX signals and provide baseband signals to a baseband processor 209, or to up-convert baseband signals provided by the baseband processor 209 and provide RF output signals for subsequent wireless transmission by the one or more antennas 207a and 213a.

Referring now to FIG. 2b, the embodiment of STA 200b that may be used to implement option 2 is shown. STA 200b as shown may be different from the embodiment of STA 200a at least in that, instead of one RF chain per antenna, it may include a number of RF chains per antenna, such as RF chain 217 and RF chain 218, with each RF chain including a transmit (TX) chain and a receive (RX) chain as would be recognized by one skilled in the art. The RF chains 217 and 218 in this embodiment are shown as being coupled to an antenna 215, the antenna 215 including a first antenna portion 207b and a second antenna portion 213b, respectively coupled to RF chain 217 and RF chain 218. Antenna portions 207b and 213b each represent a phased-array antenna portion of antenna 215, and are each shown to include respective antenna elements. Antenna portion 207b includes antenna elements 203 and 205, with each antenna element connected to its own phase shifter, such as phase shifters 220 and 221. Antenna portion 213b includes antenna elements 201 and 202, with each antenna element connected to its own phase shifter, such as phase shifters 222 and 223. The phase shifters are to allow analog beamforming in a well-known manner. Each antenna portion 207b and 213b in the embodiment of FIG. 2b is shown as being connected to its own RF chain.

The RF chains 217 and 218 may comprise circuitry configured to operate on EDMG signals to or from antennas portions 207b and 213b, to amplify the signals, typically using a single amplifier per RF chain, and to provide the amplified versions of the signals for further processing, such as to baseband processor 209 if the signals are RX signals, or to the antennas if the signals are TX signals. Embodiments further contemplate the use of other well-known components in the RF chains, such as oscillators and phase-lock loops (not shown), as would be recognized by one skilled in the art. The RF chains may further include circuitry to down-convert RX signals and provide baseband signals to a baseband processor 209, or to up-convert baseband signals provided by the baseband processor 209 and provide RF output signals for subsequent wireless transmission by the one or more antennas portions 207b and 213b.

Referring now to both FIGS. 2a and 2b, baseband processor 209 may include a memory 212, such as, for example, a set of RAM arrays in a Fast Fourier Transform or Inverse Fast Fourier Transform block (not shown) of the baseband processor 209. The memory 212 in baseband processor 209 may further including stored software and/or firmware for allowing the baseband processor to perform MAC and PHY operations, such as those described herein. Baseband processor 209 may further include processing circuitry 214 that may include control logic to process the signals received from RF chains 217 and 218. Baseband processor 209 is also configured to generate corresponding baseband signals for the transmit signal paths of RF chains 217 and 218, may further include physical layer (PHY) and medium access control layer (MAC) circuitry, and may further interface with an application processor 206 for generation and processing of the baseband signals. Also shown in FIGS. 2a and 2b is a RF controller 244 which may include circuitry to control the operation of the RF chains 217 and 218. Although, in FIGS. 2a and 2b, the RF controller 244 is shown as having its own dedicated block within system 200, embodiments are not so limited, and include within their scope the provision of an RF controller circuitry either on its own as shown, within baseband processor 209, within application processor 206, or a combination of the above, according to application needs. In some embodiments, the system 200, including any component or combination of components therein, may be configured to perform operations according to some demonstrative embodiments.

In accordance with some embodiments, the baseband processor 209 may be arranged to contend for a wireless medium and configure EDMG frames or packets for communicating over the wireless medium. The STA 200a or 200b may be arranged to transmit and receive signals, the signals being caused to be transmitted or received by the baseband processor 209 and/or application processor 206 or RF controller 244. In some embodiments, baseband processor 209 and application processor 206 and RF controller 244 of the system 200 may each include one or more processors. In other embodiments, the antennas may be arranged for receiving and sending signals, respectively. The memory 208 may store information for configuring the application processor 206 and/or baseband processor 209 and/or RF controller 244 to perform operations for configuring and causing transmission or reception of message frames and performing the various operations described herein. The memory 208 and/or 212 may include any type of memory, including non-transitory memory, for storing information in a form readable by a machine (e.g., a computer). For example, the memory 208 and/or 212 may include a computer-readable storage device may, read-only memory (ROM), random-access memory (RAM), magnetic disk storage media, optical storage media, flash-memory devices and other storage devices and media.

In some embodiments, STA 200a or 200b may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, antennas may include one or more directional, quasi omnidirectional and/or omnidirectional antennas, including, for example, phased-array antennas, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station. More regarding a configuration of the antennas will be set forth with respect to FIGS. 3a and 3b below.

Although the shown embodiments of FIGS. 2a and 2b depict the same antenna(s), that is, 207a and 213a for FIGS. 2a, and 215 for FIG. 2b, and as being used for both the TX and RX chains (through the use of a well-known TX/RX switch (not shown), embodiments are not so limited, include within their scope of the use of separate antennas for the TX chain and for the RX chain, respectively. Furthermore, although only two antennas with two antenna elements each are depicted in FIG. 2a, and although a single antenna with two antenna portions 207b and 213b are depicted in FIG. 2b, embodiments encompass within their scope the use of any number of antennas with each antenna including any number of antenna elements to effect transmission and reception, as long as, for the embodiment of FIG. 2a, there is one RF chain per antenna, and for the embodiment of FIG. 2b, there is one RF chain per antenna portion, with each antenna portion having a distinct polarization as will be explained further below. For example, the embodiment of FIGS. 2a could be interpreted as having more than two antennas, with each antenna having more than two antenna elements (as is usually the case for phased array antennas), although only two are shown for ease of reference. Similarly, the embodiment of FIG. 2b could be interpreted as having more than four antenna elements, although only four antenna elements are shown in FIG. 2b. It is understood that other modifications to the system of FIGS. 2a and 2b, including to the configuration of phase shifters, amplifiers, phase lock loops, oscillators baseband processor, memory, application processor, and/or addition or removal of various elements are within the purview of embodiments. It is further to be understood that, as used in the instant description, processing circuitry may refer to processing circuitry within one or more of a baseband processor, such as baseband processor 209, within a RF controller, such as RF controller 244, within an application processor, such as application processor 206, by way of example, or anywhere else on the STA 200a or 200b.

Although STA 200a or 200b is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 200 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 200 may include one or more processors and may be configured with instructions stored on a computer-readable storage device memory.

In some embodiments, STA 200a or 200b may include one or more of a keyboard, a display, a non-volatile memory port, multiple antennas, a graphics processor, an application processor, speakers, and other mobile device elements. The display may be an LCD screen including a touch screen.

Figure 3A:
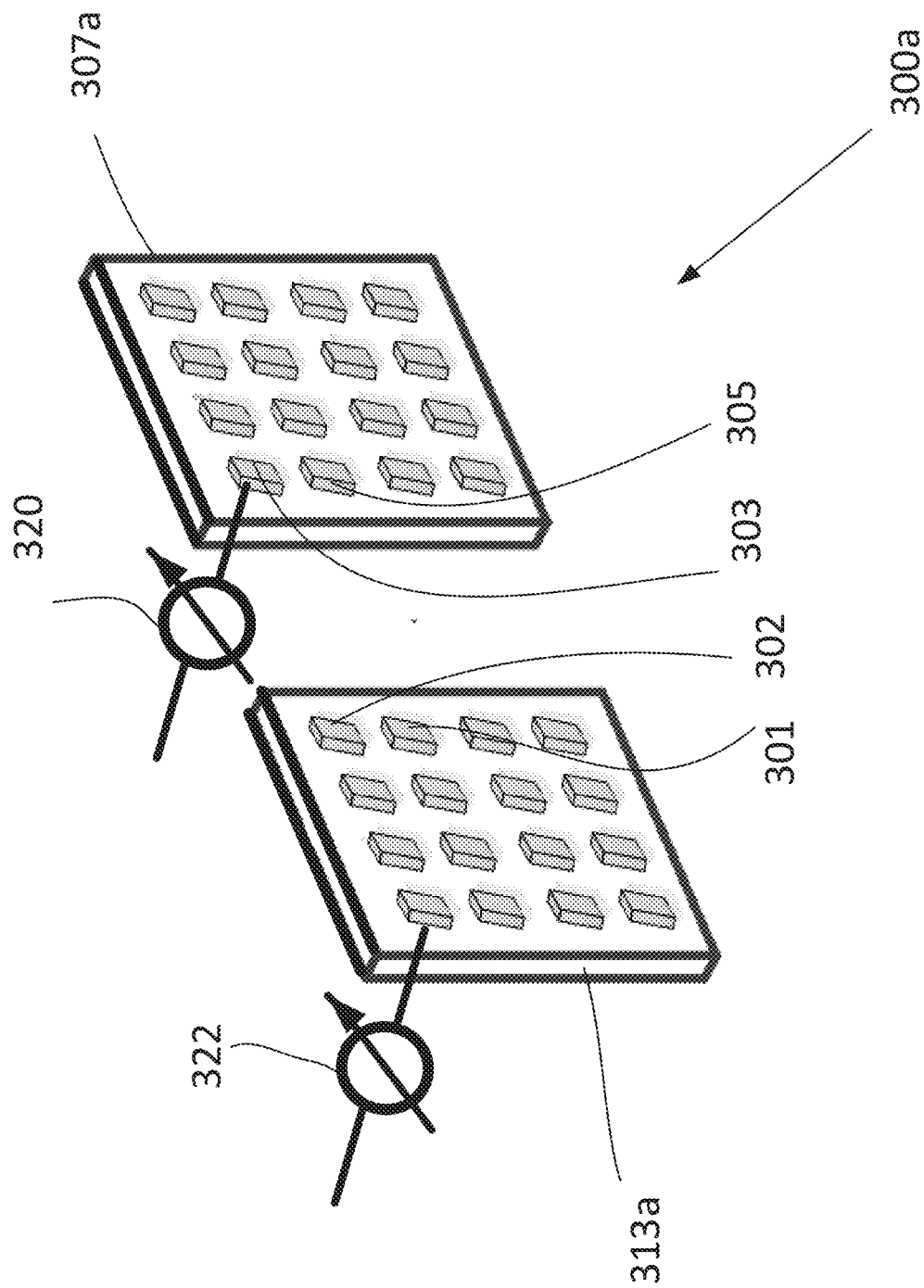
FIGS. 3a and 3b are respective schematic depictions of antenna configurations according to a first embodiment and a second embodiment.
Figure 3B:
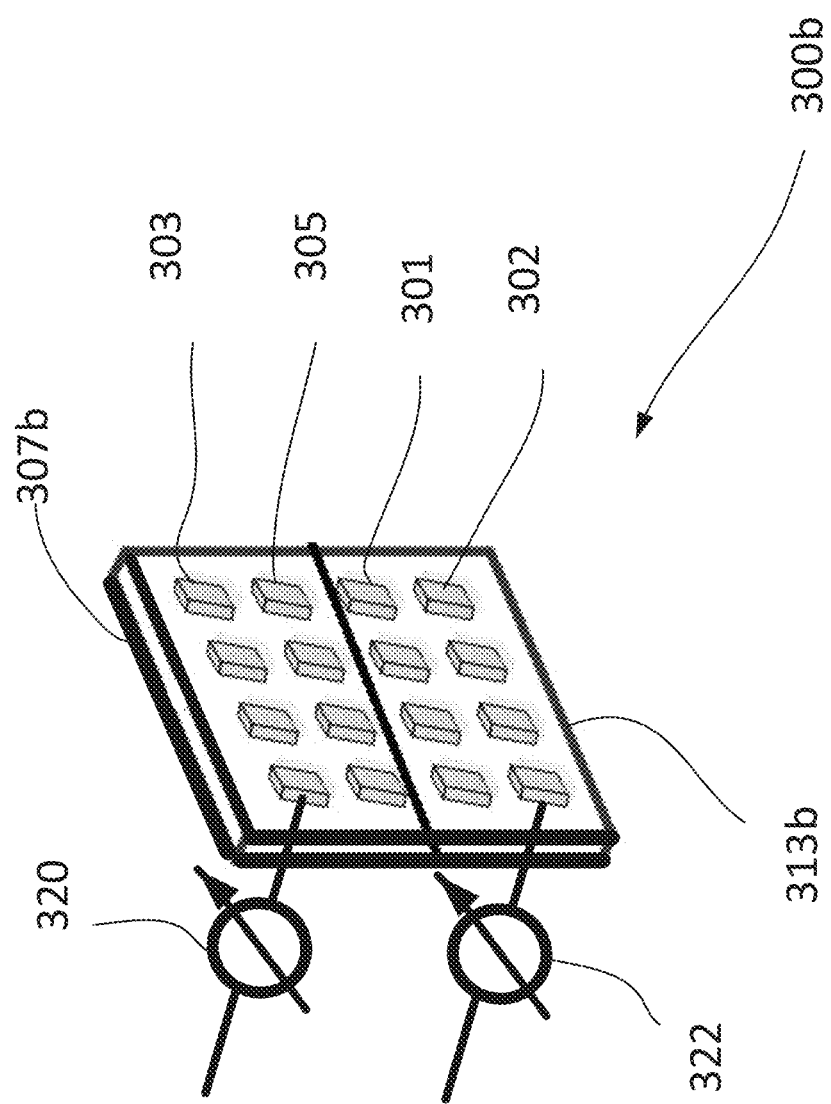

FIGS. 3a and 3b show a schematic illustration of respective antenna configurations corresponding to a first embodiment (first option or option 1, corresponding for example to the shown embodiment of FIG. 2a) and a second embodiment (second option or option 2, corresponding for example to the shown embodiment of FIG. 2b). For both options 1 and 2, for example as implemented respectively by the STA 200 of FIG. 2a and by the STA 200b of FIG. 2b, it is assumed that each wireless spatial stream (each independent signal) is to be transmitted using one RF chain, such as RF chain 217 or 218, and that each RF chain is configured to cause a quasi-omnidirectional antenna pattern. The embodiments of FIGS. 3a and 3b may further be based on the following assumptions: (1) that a wireless communication device, such as STA 200a or 200b, or any component or combination of components thereof, according to embodiments, may be ready for SISO reception when it is in an idle state, regardless of whether its next transmission is a SISO transmission or a MIMO transmission; (2) the SISO reception may require a single RF chain (RX chain) to be on at any one time; (3) the wireless communication device may activate other RF chains when a MIMO communication is expected; and (4) for a given wireless communication device antenna configuration, CCA using one polarization may not provide enough gain for CCA using an orthogonal polarization to that one polarization.

Referring first to FIG. 3a, an antenna configuration 300a is shown according to a first embodiment, or option 1. Antenna configuration 300a includes a first EDMG antenna 307a and a second EDMG antenna 313a, for example representing antennas 207a and 213a in the STA 200a of FIG. 2a. Each antenna 307a and 313a includes a plurality of antenna elements, such as antenna elements 303 and 305 of antenna 307a (it being understood that each shown antenna has many more antenna elements, only two of which are provided per antenna with reference numerals), and antenna elements 301 and 302 of antenna 313a. It is to be understood that each of the antennas shown in FIG. 3a has its own RF chain (not shown). The RF chains may, for example, correspond to RF chain 217 and 218 of FIG. 2a, with phase shifters 320 and 322 as having been shown in FIG. 3a. According to option 1, as shown by way of example in FIG. 3a, each spatial stream may be transmitted using a different EDMG antenna 307a and 313a. In the example of FIG. 3a, and according to option 1, polarization on different EDMA antennas, such as antennas 307a and 313a, may or may not be the same. For example, each of EDMG antennas 307a and 313a may have a vertical or a horizontal polarization. In addition, according to option 1, each EDMG antenna, such as antennas 307a and 313a, may have a quasi-omnidirectional antenna pattern with its own polarization.

Referring next to FIG. 3b, an antenna configuration 300b is shown according to a second embodiment, or option 2. Antenna configuration 300b includes an EDMG antenna 315, for example representing antenna 215 of FIG. 2b. Antenna 315 includes a first portion 307b including antenna elements 303 and 305, and a second portion 313b including antenna elements 301 and 302, the first portion 307b having a polarization that is orthogonal to a polarization of the second portion 313b. For example, first portion 307b may have a vertical polarization, and second portion 313b may have a horizontal polarization, or vice versa. The first portion 307b may, for example, correspond to antenna 207b of FIG. 2b, and second portion 313b may correspond to antenna 213b of FIG. 2b. Each of the first portion 307b and second portion 313b may have its own RF chain. According to option 2, as shown by way of example in FIG. 3b, a single EDMG antenna may support two orthogonal polarizations, with one set of antenna elements, such as elements 303 and 305 at a first polarization, and a second set of antenna elements, such as antenna elements 301 and 302 at a second polarization orthogonal to the first polarization. The first set and second set may for example be at two respective portions 307b and 313b of the antenna, as shown by way of example in FIG. 3b. However, on a single EDMG antenna, according to option 2, the elements of each polarization need not necessarily be collocated. Thus, although the embodiment of FIG. 3b shows a first portion 307b that occupies one half of the antenna 315, and a second portion 313b that occupies another half of the antenna 315, embodiments encompass within their scope the provision of an antenna having a plurality of antenna elements where a first set of the antenna elements defines a first portion of the antenna with a first polarization and a first RF chain, and a second set of antenna elements defines a second portion of the antenna with a second polarization orthogonal to the first polarization, the antenna elements for any one of the first and second portions being disposed according to any pattern on the antenna. According to option 2, each set of antenna elements representing a given polarization is part of a single RF chain, and is configured to transmit one spatial stream. As shown by way of example in FIG. 3b, first portion 307b with a first polarization may be part of an RF chain similar to RF chain 217 of FIG. 2b, and second portion 313b with a second orthogonal polarization us may be part of an RF chain similar to RF chain 218 of FIG. 2b. Each spatial stream may be transmitted using a single RF chain, and each polarization, corresponding to each RF chain, may have its own quasi omnidirectional pattern through a corresponding antenna portion such as antenna portions 307b and 313b. Phase shifter 320 and 322 are also shown in FIG. 3b, with a phase shifter per antenna element.

A first embodiment, pertaining to option 1 for allowing channel access in a MIMO environment will now be described in reference to FIG. 3a.

According to option 1, every RF chain of a given plurality of RF chains provided as part of a wireless communication device, such as STA/AP 200a of FIG. 2a, and such as RF chains 217 and 218, may exhibit the same behavior: the wireless communication device may thus cause preamble detection on the air medium using every RF chain of the given plurality of RF chains provided for EDMG communication, and may further be configured to maintain the NAV using every RF chain of the given plurality of RF chains. By "given plurality of RF chains" as used in this disclosure, what is meant herein is that a wireless communication device may include any number of RF chains, but that, according to embodiments, a given plurality of (that is, all or a subset of) such RF chains may be dedicated to MIMO channel access in an EDMG environment. According to option 1, the wireless communication device may further include a SISO backoff timer, and a MIMO backoff timer. The wireless communication device may use the RF chain of the given plurality of RF chains that is dedicated to SISO transmission to maintain the SISO backoff timer, with the behavior of the SISO backoff timer being in compliance with the backoff timer defined in IEEE 802.11ad. The wireless communication device may further use all RF chains to maintain the MIMO backoff timer, such that the MIMO backoff timer decreases in response to a determination that all RF chains show a clear channel, and freezes when at least one RF chain shows a busy channel, with MIMO channel access being allowed when the MIMO backoff channel reaches 0. As noted previously, option 1 may use an antenna configuration similar to antenna configuration 300a shown in FIG. 3a, with an RF chain per antenna, and a phase shifter per antenna element.

According to option 2, a wireless communication device, such as STA/AP 200b of FIG. 2b, may include a primary RF chain and a secondary RF chain of a given plurality of RF chains, for example a primary RF chain 216 and a secondary RF chain 217, with the primary RF chain being used for SISO communication, and the secondary RF chain being the RF chain that is not used for SISO communication, but only for MIMO communication. According to option 2, the wireless communication device may cause preamble detection on wireless signals on the air medium using the primary RF chain of the given plurality of RF chains, such as primary RF chain 217 and 218 of FIG. 2b, and may further be configured to maintain the NAV this same primary RF chain. According to option 2, the wireless communication device may cause the secondary RF chains, such as RF chain 217 of FIG. 2b, to maintain CCA using energy detection (for example either a quasi-omnidirectional CCA or a directional CCA) to allow MIMO transmissions. The wireless communication device may further include a single backoff timer and may use the primary RF chain to maintain the backoff timer such that: (1) the backoff timer decreases in response to a determination that the primary RF chain indicates that the channel is clear; (2) the backoff timer freezes in response to a determination that the channel is busy; (3) in response to a determination that the backoff timer has reached 0: a) the wireless communication device may access a SISO channel using the primary RF chain; and b) in response to a further determination that all secondary RF chains indicate CCA is clear for a PIFS duration, the wireless communication device may access MIMO channels. As noted previously, option 2 may use an antenna configuration similar to antenna configuration 300b shown in FIG. 3b, with an RF chain per antenna portion, with each antenna portion defined by a polarization that is orthogonal to another antenna portion on the same antenna, and with a phase shifter per antenna element.

Some embodiments pertain to a wireless communication device comprising a memory (such as memory 208 of FIG. 2a or 2b) and a processing circuitry coupled to the memory (such as processing circuitry in any one or combination of the baseband processor 209, application processor 206 and RF controller 244 of FIGS. 2a and 2b) and including logic, the processing circuitry to cause communication in an Enhanced Directional Multi-Gigabit (EDMG) network (such as the EDMG networks of FIG. 1), the processing circuitry further being configured to: activate at least one Radio Frequency (RF) chain of a plurality of RF chains to allow detection of a preamble of a wireless communication and to allow. For example, referring to FIG. 2a and for option 1, the processing circuitry, in the form of RF controller 244, may activate all of the RF chains 217 and 218 in order to allow preamble detection and NAV setting. For example, referring to FIG. 2b and for option 2, the processing circuitry, in the form of RF controller 244, may activate only a primary RF chain, such as RF chain 217 in order to allow preamble detection and NAV setting. Thereafter, the processing circuitry may set the NAV and detect the preamble. For example, referring to FIG. 2a and for option 1, the processing circuitry, in the form of baseband processor 209 and/or application processor 206, may detect the preamble and set the NAV using all of the activated RF chains 217 and 218. For example, referring to FIG. 2b and for option 2, the processing circuitry, in the form of baseband processor 209 and/or application processor 206, may detect the preamble and set the NAV using only the primary RF chain 217. The processing circuitry may maintain a backoff timer for the at least one RF chain. For example, referring to FIG. 2a and for option 1, the processing circuitry, in the form of baseband processor 209 and/or application processor 206, may maintain a SISO backoff timer on the RF chain typically used for SISO, and a MIMO backoff counter of all of the RF chains 217 and 218. For example, referring to FIG. 2b and for option 2, the processing circuitry, in the form of baseband processor 209 and/or application processor 206, may maintain a backoff timer only on the primary RF chain 217. The processing circuitry may, in response to a determination that the backoff timer has reached zero, cause a Multiple Input Multiple Output (MIMO) wireless communication in the EDMG network. For example, referring to FIG. 2a and for option 1, the processing circuitry, in the form of baseband processor 209 and/or application processor 206, may maintain a SISO backoff timer on the RF chain typically used for SISO, and a MIMO backoff counter of all of the RF chains 217 and 218. For example, referring to FIG. 2b and for option 2, the processing circuitry, in the form of baseband processor 209 and/or application processor 206, may maintain a backoff timer only on the primary RF chain 217.

A wireless communication device according to option 1 may maintain a first backoff timer on each RF chain of the plurality of RF chain, maintain a second backoff timer on a single RF chain of the plurality of RF chains, cause the MIMO wireless communication in response to a determination that the first backoff timer has reached zero, and cause a SISO wireless communication in response to a determination that the second backoff timer has reached zero. For example, referring to FIG. 2a and for option 1, the processing circuitry, in the form of baseband processor 209 and/or application processor 206, may maintain a MIMO backoff counter on all of the RF chains 217 and 218, and maintain a SISO backoff counter on only RF chain 217, and may cause MIMO wireless communication when the MIMO backoff counter has reached zero, and cause a SISO wireless communication when the SISO backoff counter has reached zero.

A wireless communication device according to option 2 may maintain a backoff timer on only the primary RF chain (that is, on only the primary RF chain for EDMG communication), perform Clear Channel Access (CCA) energy detection on the plurality of secondary RF chains for a predetermined time duration after a determination that he backoff timer has reached zero, cause the MIMO wireless communication in response to a determination that the backoff timer has reached zero, and to a determination that the CCA energy detection on the plurality of secondary RF chains indicates a clear medium, and cause a SISO wireless communication in response to a determination that the backoff timer has reached zero. For example, referring to FIG. 2b and for option 2, the processing circuitry, in the form of baseband processor 209 and/or application processor 206, may maintain a backoff counter only on RF chain 217, but perform CCA energy detection on RF chain 218, for example for a PIFS time period after the backoff timer has reached zero. The processing circuitry may then cause MIMO channel access when the backoff timer has reached zero and when the CCA energy detection on RF chain 218 shows a clear medium.

A comparison of features, advantages and disadvantages of each of option 1 and option 2 will be set forth below with respect to the impact of each option on the Medium Access Control layer (MAC) features of a wireless communication device, and also on the Physical layer (PHY) features of a wireless communication device.

Regarding impact of MAC features on a wireless communication device, option 1 provide preamble detection in all directions of interest, as it uses all RF chains for this purpose. In this way, option 1 provides good CCA sensitivity to the wireless communication device. Option 2 on the other hand provides preamble detection on the primary RF chain only, and energy detection on secondary RF chains, in this way resulting in CCA sensitivity on the secondary channels that is not as strong as that of option 1. In addition, with respect to NAV observation and maintenance, option 1 provide full NAV observation on all RF chains, while option 2 provide NAV observation only on the primary RF chain, with no NAV knowledge on the secondary RF chains. Regarding channel access, both options allow SISO channel access when the backoff timer reaches 0, although, for option 1, the MIMO channel access is guaranteed when the MIMO backoff timer reaches 0, while for option 2, the MIMO channel access may be possible only if the secondary RF chains show CCA as clear for a time period, such as a PIFS time period.

Regarding impact of PHY features on a wireless communication device, and specifically regarding receiver architecture, option 1 requires support of simultaneous reception (e.g. to allow simultaneous preamble detection and simultaneous NAV observation), possibly requiring additional Low-Density Parity Check (LDPC) decoders and/or LDPC decoders that are faster when compared to receivers that do not allow simultaneous reception. On the other hand, option 2 requires only one reception at a time, with only energy detection per RF chain, and in this way, may provide a simpler PHY receiver architecture. In addition, options 1 and 2 both support SISO reception before the backoff timer reaches 0.

Figure 4:
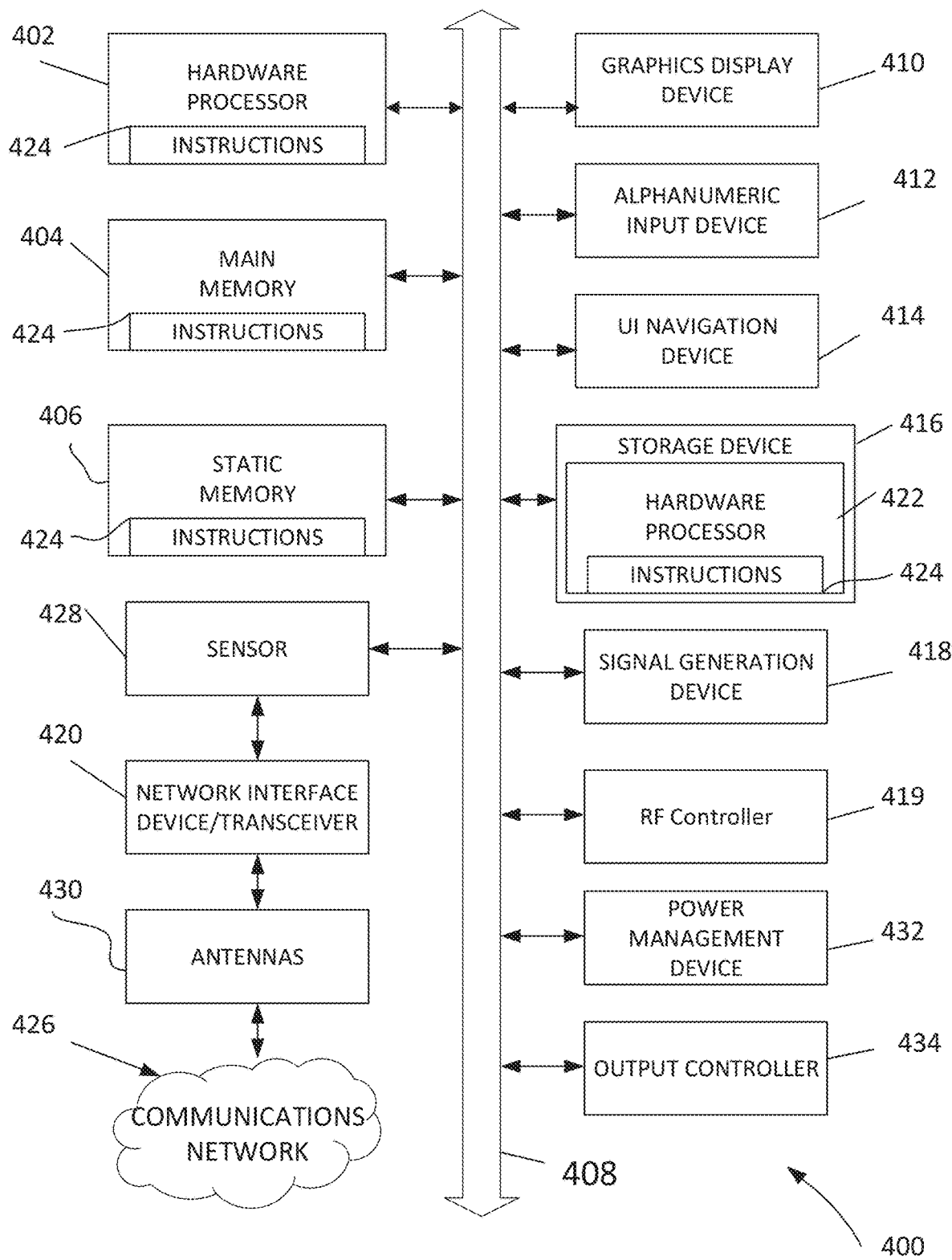
FIG. 4 shows a block diagram of an example machine upon which any of one or more techniques (e.g., methods) may be performed, in accordance with one or more embodiments of the disclosure.

FIG. 4 illustrates a block diagram of an example of a machine 400 or system upon which any one or more of the techniques (e.g., methodologies) discussed herein may be performed. In other embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environments. The machine 400 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a power management device 432, a graphics display device 410, an alphanumeric input device 412 (e.g., a keyboard), and a user interface (UI) navigation device 414 (e.g., a mouse). In an example, the graphics display device 410, alphanumeric input device 412, and UI navigation device 414 may be a touch screen display. The machine 400 may additionally include a storage device (i.e., drive unit) 416, a signal generation device 418 (e.g., a speaker), a RF controller 419, a network interface device/transceiver 420 coupled to antenna(s) 430, and one or more sensors 428, such as a global positioning system (GPS) sensor, compass, accelerometer, or another sensor. The machine 400 may include an output controller 434, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within the static memory 406, or within the hardware processor 402 during execution thereof by the machine 400. In an example, one or any combination of the hardware processor 402, the main memory 404, the static memory 406, or the storage device 416 may constitute machine-readable media.

The RF controller 419 (which may include for example logic within baseband processor 209, within application processor 206, within any other processor on the machine 400) may be configured to control the RF chains within the machine to effect functionality described with respect to embodiments, such as with respect to options 1 and 2 described above in relation to FIGS. 2a, 2b, 3a and 3b.

While the machine-readable medium 422 is illustrated as a single medium, the term "machine-readable medium" may include a single medium or multiple media (e.g., a centralized or distributed database, and/or associated caches and servers) configured to store the one or more instructions 424.

The term "machine-readable medium" may include any medium that is capable of storing, encoding, or carrying instructions for execution by the machine 400 and that cause the machine 400 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device/transceiver 420 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 420 may include one or more physical jacks (e.g., Ethernet, coaxial, or phone jacks) or one or more antennas to connect to the communications network 426. In an example, the network interface device/transceiver 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 5:
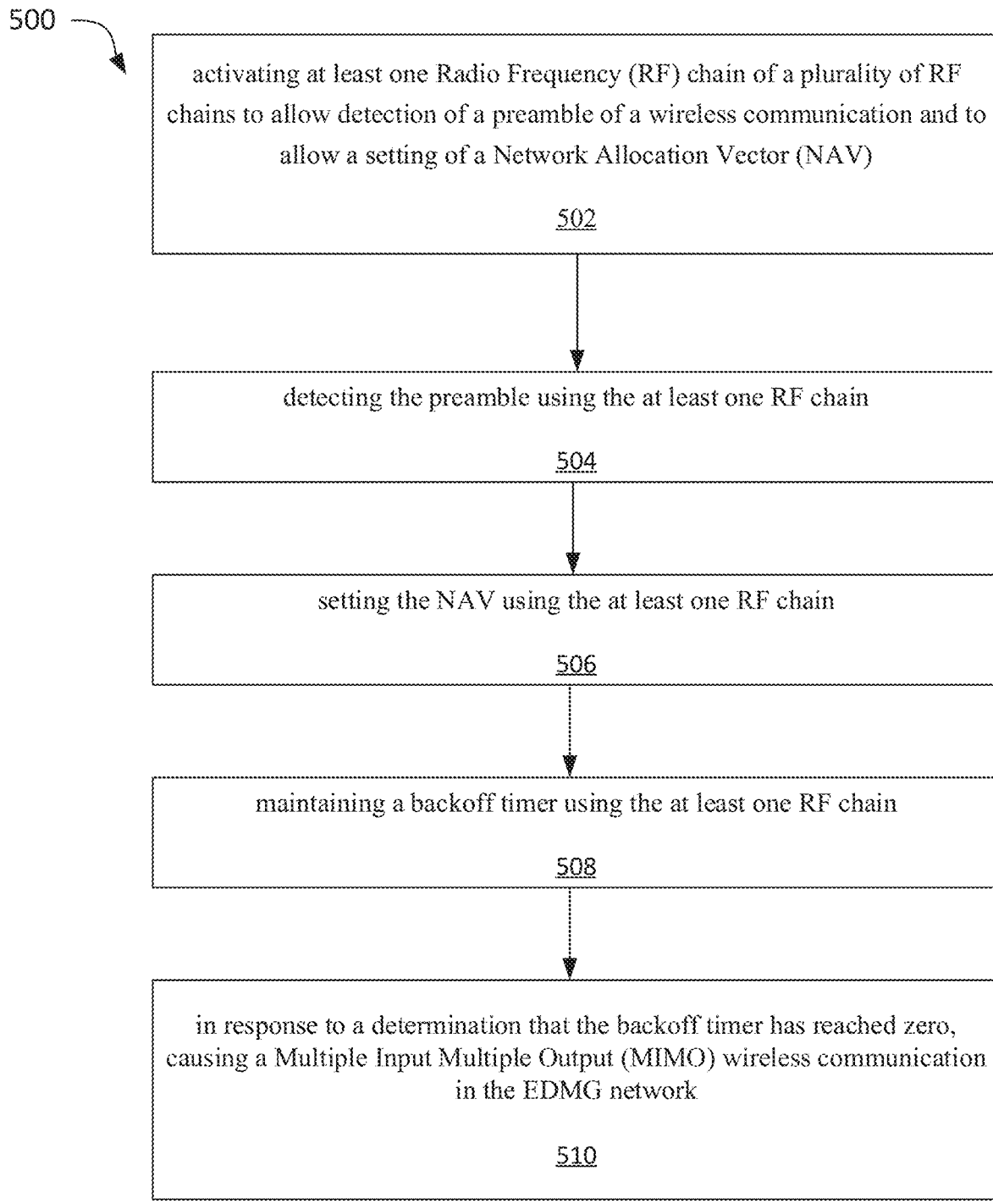
FIG. 5 shows a flow diagram of a method according to an exemplary embodiment.

Reference is made to FIG. 5, which schematically illustrates a method in accordance with some demonstrative embodiments. For example, one or more of the operations of the method 500 of FIG. 5 may be performed by one or more elements of a STA, such as STA 200 of FIG. 2.

As indicated at block 502, the method includes activating at least one Radio Frequency (RF) chain of a plurality of RF chains to allow detection of a preamble of a wireless communication and to allow a setting of a Network Allocation Vector (NAV). At block 504, the method includes detecting the preamble using the at least one RF chain. Thereafter, at block 506, the method includes setting the NAV using the at least one RF chain. At block 508, the method includes maintaining a backoff timer for the at least one RF chain. At block 510, the method includes, in response to a determination that the backoff timer has reached zero, causing a Multiple Input Multiple Output (MIMO) wireless communication in the EDMG network.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary. In addition, when "at least one of" a given set or list of items connected with "and" is mentioned herein, what is meant is a reference to either one of the noted items or any combination of the items. For example, as used herein, "at least one of A, B, and C" means A, or B, or C, or A and B, or A and C, or B and C, or A and B and C.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments can relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WIRELESS COMMUNICATION DEVICEMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

EXAMPLES

The following examples pertain to further embodiments.

Example 1 includes a wireless communication device comprising a memory, a processing circuitry coupled to the memory and including logic, the processing circuitry to cause communication in an Enhanced Directional Multi-Gigabit (EDMG) network, the processing circuitry further configured to: activate at least one Radio Frequency (RF) chain of a plurality of RF chains to allow detection of a preamble of a wireless communication and to allow a setting of a Network Allocation Vector (NAV); detect the preamble using the at least one RF chain; set the NAV using the at least one RF chain; maintain a backoff timer for the at least one RF chain; and in response to a determination that the backoff timer has reached zero, cause a Multiple Input Multiple Output (MIMO) wireless communication in the EDMG network.

Example 2 includes the subject matter of Example 1, and optionally, wherein the backoff timer is a first backoff timer, and wherein the processing circuitry is to: maintain the first backoff timer on each RF chain of the plurality of RF chain; maintain a second backoff timer on a single RF chain of the plurality of RF chains; cause the MIMO wireless communication in response to a determination that the first backoff timer has reached zero; cause a SISO wireless communication in response to a determination that the second backoff timer has reached zero.

Example 3 includes the subject matter of Example 1, and optionally, wherein the plurality of RF chains includes a primary RF chain and a plurality of secondary RF chains, and wherein processing circuitry is to: maintain the backoff timer on only the primary RF chain; perform Clear Channel Access (CCA) energy detection on the plurality of secondary RF chains for a predetermined time duration after a determination that he backoff timer has reached zero; cause the MIMO wireless communication in response to a determination that the backoff timer has reached zero, and to a determination that the CCA energy detection on the plurality of secondary RF chains indicates a clear medium; cause a SISO wireless communication in response to a determination that the backoff timer has reached zero.

Example 4 includes the subject matter of Example 1, and optionally, wherein the processing circuitry is further configured to: activate all RF chains of the plurality of RF chains to allow detection of the preamble; and detect the preamble using said all RF chains.

Example 5 includes the subject matter of Example 1, and optionally, wherein the plurality of RF chains includes a primary RF chain and a plurality of secondary RF chains, and wherein processing circuitry is to: activate only the primary RF chain to allow detection of the preamble; and detect the preamble using only the primary RF chain.

Example 6 includes the subject matter of Example 1 wand optionally, herein the processing circuitry is further configured to: activate all RF chains of the plurality of RF chains to allow setting the NAV; and set the NAV using said all RF chains.

Example 7 includes the subject matter of Example 1, and optionally, wherein the plurality of RF chains includes a primary RF chain and a plurality of secondary RF chains, and wherein processing circuitry is to: activate only the primary RF chain to allow setting the NAV; and set the NAV using only the primary RF chain.

Example 8 includes the subject matter of any one of Examples 1-7, and optionally, wherein the processing circuitry is to cause processing of a received SISO signal before the backoff timer reaches zero.

Example 9 includes the subject matter of any one of Examples 1-7, and optionally, further comprising the plurality of RF chains, the RF chains being coupled to the processing circuitry.

Example 10 includes the subject matter of Example 9, and optionally, further comprising at least one phased array antenna coupled to the RF chains.

Example 11 includes the subject matter of any one of Examples 1, 2, 4 and 6, and optionally, further comprising: the plurality of RF chains, the RF chains being coupled to the processing circuitry; and a plurality of phased array antennas, each of the plurality of phased array antennas coupled to a corresponding RF chain of the plurality of RF chains.

Example 12 includes the subject matter of any one of Examples 1, 3, 5 and 7, and optionally, wherein, further comprising: the plurality of RF chains, the RF chains being coupled to the processing circuitry; and a phased array antenna coupled to the plurality of RF chains, wherein the phased array antenna includes a first antenna portion having a first polarization, and a second antenna portion having a second polarization orthogonal to the first polarization, the first antenna portion being coupled to one RF chain of the plurality of RF chains, and the second antenna portion being coupled to another RF chain of the plurality of RF chains.

Example 13 includes a method to be performed by a wireless communication device, the method comprising: activating at least one Radio Frequency (RF) chain of a plurality of RF chains to allow detection of a preamble of a wireless communication and to allow a setting of a Network Allocation Vector (NAV); detecting the preamble using the at least one RF chain; setting the NAV using the at least one RF chain; maintaining a backoff timer for the at least one RF chain; and in response to a determination that the backoff timer has reached zero, causing a Multiple Input Multiple Output (MIMO) wireless communication in the EDMG network.

Example 14 includes the subject matter of Example 13, and optionally, wherein the backoff timer is a first backoff timer, and further including: maintaining the first backoff timer on each RF chain of the plurality of RF chain; maintaining a second backoff timer on a single RF chain of the plurality of RF chains; causing the MIMO wireless communication in response to a determination that the first backoff timer has reached zero; causing the SISO wireless communication in response to a determination that the second backoff timer has reached zero.

Example 15 includes the subject matter of Example 13, and optionally, wherein the plurality of RF chains includes a primary RF chain and a plurality of secondary RF chains, and further including: maintaining the backoff timer on only the primary RF chain; performing Clear Channel Access (CCA) energy detection on the plurality of secondary RF chains for a predetermined time duration after a determination that he backoff timer has reached zero; causing the MIMO wireless communication in response to a determination that the backoff timer has reached zero, and to a determination that the CCA energy detection on the plurality of secondary RF chains indicates a clear medium; and causing the SISO wireless communication in response to a determination that the backoff timer has reached zero.

Example 16 includes the subject matter of Example 13, and optionally, further including: activating all RF chains of the plurality of RF chains to allow detection of the preamble; and detecting the preamble using said all RF chains.

Example 17 includes the subject matter of Example 13, and optionally, wherein the plurality of RF chains includes a primary RF chain and a plurality of secondary RF chains, and further including: activating only the primary RF chain to allow detection of the preamble; and detecting the preamble using only the primary RF chain.

Example 18 includes the subject matter of Example 13, and optionally, further including: activating all RF chains of the plurality of RF chains to allow setting the NAV; and setting the NAV using said all RF chains.

Example 19 includes the subject matter of Example 13, and optionally, wherein the plurality of RF chains includes a primary RF chain and a plurality of secondary RF chains, and further including: activating only the primary RF chain to allow setting the NAV; and setting the NAV using only the primary RF chain.

Example 20 includes the subject matter of any one of Examples 13-19, and optionally, further including processing of a received SISO signal before the backoff timer reaches zero.

Example 21 includes a product comprising one or more tangible computer-readable non-transitory storage media comprising computer-executable instructions operable to, when executed by at least one computer processor, enable the at least one computer processor to perform the method of any one of Examples 13-20.

Example 22 includes a wireless communication device comprising: means for activating at least one Radio Frequency (RF) chain of a plurality of RF chains to allow detection of a preamble of a wireless communication and to allow a setting of a Network Allocation Vector (NAV); means for detecting the preamble using the at least one RF chain; means for setting the NAV using the at least one RF chain; means for maintaining a backoff timer for the at least one RF chain; and means for causing, in response to a determination that the backoff timer has reached zero, a Multiple Input Multiple Output (MIMO) wireless communication in the EDMG network.

Example 23 includes the subject matter of Example 22, and optionally, wherein the backoff timer is a first backoff timer, and further including: means for maintaining the first backoff timer on each RF chain of the plurality of RF chain; means for maintaining a second backoff timer on a single RF chain of the plurality of RF chains; means for causing the MIMO wireless communication in response to a determination that the first backoff timer has reached zero; means for causing the SISO wireless communication in response to a determination that the second backoff timer has reached zero.

Example 24 includes the subject matter of Example 22, and optionally, wherein the plurality of RF chains includes a primary RF chain and a plurality of secondary RF chains, and the device further including: means for maintaining the backoff timer on only the primary RF chain; means for performing Clear Channel Access (CCA) energy detection on the plurality of secondary RF chains for a predetermined time duration after a determination that he backoff timer has reached zero; means for causing the MIMO wireless communication in response to a determination that the backoff timer has reached zero, and to a determination that the CCA energy detection on the plurality of secondary RF chains indicates a clear medium; causing the SISO wireless communication in response to a determination that the backoff timer has reached zero.

Example 25 includes the subject matter of Example 22, and optionally, further including: means for activating all RF chains of the plurality of RF chains to allow detection of the preamble; and means for detecting the preamble using said all RF chains.

Example 26 includes the subject matter of Example 22, and optionally, wherein the plurality of RF chains includes a primary RF chain and a plurality of secondary RF chains, and further including: means for activating only the primary RF chain to allow detection of the preamble; and means for detecting the preamble using only the primary RF chain.

Example 27 includes the subject matter of Example 22, and optionally, further including: means for activating all RF chains of the plurality of RF chains to allow setting the NAV; and means for setting the NAV using said all RF chains.

Example 28 includes the subject matter of Example 22, and optionally, wherein the plurality of RF chains includes a primary RF chain and a plurality of secondary RF chains, and further including: means for activating only the primary RF chain to allow setting the NAV; and means for setting the NAV using only the primary RF chain.

Example 29 includes the subject matter of any one of Examples 13-19, and optionally, wherein, further including means for processing of a received SISO signal before the backoff timer reaches zero.

Example 30 includes a product comprising one or more tangible computer-readable non-transitory storage media comprising computer-executable instructions operable to, when executed by at least one computer processor, cause the at least one computer processor to implement operations at a wireless communication device, the operations comprising: activating at least one Radio Frequency (RF) chain of a plurality of RF chains to allow detection of a preamble of a wireless communication and to allow a setting of a Network Allocation Vector (NAV); detecting the preamble using the at least one RF chain; setting the NAV using the at least one RF chain; maintaining a backoff timer for the at least one RF chain; and in response to a determination that the backoff timer has reached zero, causing a Multiple Input Multiple Output (MIMO) wireless communication in the EDMG network.

Example 31 includes the subject matter of Example 30, and optionally, wherein the backoff timer is a first backoff timer, the operations further including: maintaining the first backoff timer on each RF chain of the plurality of RF chain; maintaining a second backoff timer on a single RF chain of the plurality of RF chains; causing the MIMO wireless communication in response to a determination that the first backoff timer has reached zero; causing the SISO wireless communication in response to a determination that the second backoff timer has reached zero.

Example 32 includes the subject matter of Example 30, and optionally, wherein the plurality of RF chains includes a primary RF chain and a plurality of secondary RF chains, and further including: maintaining the backoff timer on only the primary RF chain; performing Clear Channel Access (CCA) energy detection on the plurality of secondary RF chains for a predetermined time duration after a determination that he backoff timer has reached zero; causing the MIMO wireless communication in response to a determination that the backoff timer has reached zero, and to a determination that the CCA energy detection on the plurality of secondary RF chains indicates a clear medium; causing the SISO wireless communication in response to a determination that the backoff timer has reached zero.

Example 33 includes the subject matter of Example 30, and optionally, further including: activating all RF chains of the plurality of RF chains to allow detection of the preamble; and detecting the preamble using said all RF chains.

Example 34 includes the subject matter of Example 30, and optionally, wherein the plurality of RF chains includes a primary RF chain and a plurality of secondary RF chains, and further including: activating only the primary RF chain to allow detection of the preamble; and detecting the preamble using only the primary RF chain.

Example 35 includes the subject matter of Example 30, and optionally, further including: activating all RF chains of the plurality of RF chains to allow setting the NAV; and setting the NAV using said all RF chains.

Example 36 includes the subject matter of Example 30, and optionally, wherein the plurality of RF chains includes a primary RF chain and a plurality of secondary RF chains, and further including: activating only the primary RF chain to allow setting the NAV; and setting the NAV using only the primary RF chain.

Example 37 includes the subject matter of any one of Examples 30-36, and optionally, wherein, further including processing of a received SISO signal before the backoff timer reaches zero.

What is claimed is:

1. A wireless communication device of an Enhanced Directional Multi-Gigabit (EDMG) station (STA), the device comprising a memory, and processing circuitry coupled to the memory and including logic, the processing circuitry to:
    perform Clear Channel Assessment (CCA) energy detection at a plurality of radio frequency (RF) chains of the EDMG STA;
    in response to a determination that CCA is clear for only a first RF chain of the plurality of RF chains, and that a backoff timer of the EDMG STA has reached zero, cause transmission of a Single Input Single Output (SISO) EDMG communication; and
    in response to a determination that CCA for the plurality of RF chains is clear, and that the backoff timer has reached zero, cause transmission of a Multiple-Input Multiple-Output (MIMO) EDMG communication, wherein the plurality of RF chains includes a primary RF chain and a plurality of secondary RF chains, and wherein the processing circuitry is further configured to cause preamble detection using only the primary RF chain to maintain a Network Allocation Vector (NAV).

2. The device of claim 1, wherein the MIMO communication is a multi-user (MU) MIMO communication.

3. The device of claim 1, further comprising the plurality of RF chains, the RF chains being coupled to the processing circuitry.

4. The device of claim 3, further comprising at least one phased array antenna coupled to the RF chains.

5. The device of claim 1, further comprising:
    the plurality of RF chains, the RF chains being coupled to the processing circuitry; and
    a plurality of phased array antennas, each of the plurality of phased array antennas coupled to a corresponding RF chain of the plurality of RF chains.

6. The device of claim 1, further comprising:
    the plurality of RF chains, the RF chains being coupled to the processing circuitry; and
    a phased array antenna coupled to the plurality of RF chains, wherein the phased array antenna includes a first antenna portion having a first polarization, and a second antenna portion having a second polarization orthogonal to the first polarization, the first antenna portion being coupled to one RF chain of the plurality of RF chains, and the second antenna portion being coupled to another RF chain of the plurality of RF chains.

7. A product comprising one or more tangible computer-readable non-transitory storage media comprising computer-executable instructions operable to, when executed by at least one computer processor, cause the at least one computer processor to implement operations at a wireless communication device of an Enhanced Directional Multi-Gigabig (EDMG) station (STA), the operations comprising:
  performing Clear Channel Assessment (CCA) energy detection at a plurality of radio frequency (RF) chains of the EDMG STA;
  in response to a determination that CCA is clear for only a first RF chain of the plurality of RF chains, and that a backoff timer of the EDMG STA has reached zero, causing transmission of a Single Input Single Output (SISO) EDMG communication; and
  in response to a determination that CCA for the plurality of RF chains is clear, and that the backoff timer has reached zero, causing transmission of a Multiple-Input Multiple-Output (MIMO) EDMG communication, wherein the plurality of RF chains includes a primary RF chain and a plurality of secondary RF chains, the operations further including causing preamble detection using only the primary RF chain to maintain the Network Allocation Vector (NAV).

8. The product of claim 7, wherein the MIMO communication is a multi-user (MU) MIMO communication.

9. A method to be used at a wireless communication device of an Enhanced Directional Multi-Gigabig (EDMG) station (STA), the method comprising:
  performing Clear Channel Assessment (CCA) energy detection at a plurality of radio frequency (RF) chains of the EDMG STA;
  in response to a determination that CCA is clear for only a first RF chain of the plurality of RF chains, and that a backoff timer of the EDMG STA has reached zero, causing transmission of a Single Input Single Output (SISO) EDMG communication; and
  in response to a determination that CCA for the plurality of RF chains is clear, and that the backoff timer has reached zero, causing transmission of a Multiple-Input Multiple-Output (MIMO) EDMG communication, wherein the plurality of RF chains includes a primary RF chain and a plurality of secondary RF chains, the method further including causing preamble detection using only the primary RF chain to maintain the Network Allocation Vector (NAV).

10. The method of claim 9, wherein the MIMO communication is a multi-user (MU) MIMO communication.

11. A wireless communication device of an Enhanced Directional Multi-Gigabig (EDMG) station (STA), the device comprising:
  means for performing Clear Channel Assessment (CCA) energy detection at a plurality of radio frequency (RF) chains of the EDMG STA;
  means for, in response to a determination that CCA is clear for only a first RF chain of the plurality of RF chains, and that a backoff timer of the EDMG STA has reached zero, causing transmission of a Single Input Single Output (SISO) EDMG communication; and
  means for, in response to a determination that CCA for the plurality of RF chains is clear, and that the backoff timer has reached zero, causing transmission of a Multiple-Input Multiple-Output (MIMO) EDMG communication, wherein the plurality of RF chains includes a primary RF chain and a plurality of secondary RF chains, the method further including causing preamble detection using only the primary RF chain to maintain the Network Allocation Vector (NAV).

12. The device of claim 11, wherein the MIMO communication is a multi-user (MU) MIMO communication.

* * * * *